US012772093B2

(12) United States Patent
Okano et al.

(10) Patent No.: US 12,772,093 B2
(45) Date of Patent: Oct. 20, 2026

(54) TERMINAL, RADIO COMMUNICATION METHOD, AND BASE STATION

(71) Applicant: NTT DOCOMO, INC., Tokyo (JP)

(72) Inventors: Mayuko Okano, Tokyo (JP); Hiroki Harada, Tokyo (JP); Daisuke Kurita, Tokyo (JP); Tomoya Ohara, Tokyo (JP); Masaya Okamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 307 days.

(21) Appl. No.: 18/572,027

(22) PCT Filed: Jun. 21, 2021

(86) PCT No.: PCT/JP2021/023466
§ 371 (c)(1),
(2) Date: Dec. 19, 2023

(87) PCT Pub. No.: WO2022/269715
PCT Pub. Date: Dec. 29, 2022

(65) Prior Publication Data
US 2024/0292259 A1 Aug. 29, 2024

(51) Int. Cl.
*H04W 52/02* (2009.01)
*H04W 24/10* (2009.01)
*H04W 48/16* (2009.01)

(52) U.S. Cl.
CPC .................................. *H04W 24/10* (2013.01)

(58) Field of Classification Search
CPC . H04W 24/10; H04W 48/16; H04W 52/0209; H04W 28/02
See application file for complete search history.

(56) References Cited

U.S. PATENT DOCUMENTS

2015/0358890 A1 12/2015 Xu et al.
2021/0105649 A1 4/2021 Lee
2021/0235344 A1* 7/2021 Jung .................... H04W 36/32
2021/0392525 A1* 12/2021 Kaikkonen ........... H04W 24/08
(Continued)

FOREIGN PATENT DOCUMENTS

CN 112970280 A 6/2021
JP 2016504887 A 2/2016
WO 2020000156 A1 1/2020

OTHER PUBLICATIONS

3GPP TSG-RAN WG2 Meeting #114-e, R2-2105418 Title: Summary of [Post113bis-e][RedCap] RRM relaxations (Year: 2021).*
(Continued)

*Primary Examiner* — Christopher M Crutchfield
*Assistant Examiner* — Abusayeed M Haque
(74) *Attorney, Agent, or Firm* — Osha Bergman Watanabe & Burton LLP

(57) ABSTRACT

A terminal according to one aspect of the present disclosure includes a control section that determines, in a radio resource control (RRC) connected state, relaxation of at least one of measurement and reporting for radio resource management (RRM) on the basis of a given condition, and a transmitting/receiving section that performs at least one of the measurement and reporting to which the relaxation is applied. According to one aspect of the present disclosure, it is possible to appropriately perform relaxation of measurement/reporting.

4 Claims, 5 Drawing Sheets

(56) References Cited

U.S. PATENT DOCUMENTS

| | | | | |
|---|---|---|---|---|
| 2021/0400508 | A1 | 12/2021 | Ohara | |
| 2022/0030453 | A1 * | 1/2022 | Kumar | H04W 36/08 |

OTHER PUBLICATIONS

3GPP TSG-RAN WG2 Meeting #106, R2-1905758 Title: Discussion on SSB periodicity addition in SIB (Year: 2019).*
3GPP TSG-RAN WG2 Meeting #114 electronic; R2-2104811; OPPO; “Discussion on RRM relax for RedCap UEs”; Online, May 19-27, 2021 (5 pages).
Extended European Search Report in counterpart European Application No. 21947004.4 issued Mar. 13, 2025 (11 pages).
Office Action issued in Japanese Patent Application No. 2023-529241, issued Jun. 17, 2025 (8 pages).
3GPP TS 36.300 V8.12.0 “3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)” Mar. 2010 (149 pages).
3GPP TSG-RAN WG2 Meeting #114 electronic; R2-2106472 “Report from Break-out session on R17 NTN and REDCAP” Vice Chairman (ZTE Corporation); Online, May 19-27, 2021 (2 pages).
3GPP TSG-RAN WG2 Meeting #114-e; R2-2105418 “Summary of [Post113bis-e][102][RedCap] RRM relaxations” Qualcomm Incorporated; Online, May 19-27, 2021 (21 pages).
International Search Report issued in International Application No. PCT/JP2021/023466, mailed Jan. 25, 2022 (7 pages).
Written Opinion issued in International Application No. PCT/JP2021/023466; Dated Jan. 25, 2022 (4 pages).

* cited by examiner

Table 10.1.2.1.1-1: SS-RSRP Intra frequency absolute accuracy in FR1

| Accuracy | | Conditions | | | | | |
|---|---|---|---|---|---|---|---|
| Normal condition | Extreme condition | SSB Ês/Iot | Io [Note 1] range | | | | |
| | | | NR operating band groups [Note 2] | Minimum Io | | | Maximum Io |
| dB | dB | dB | | dBm / $SCS_{SSB}$ | | $dBm/BW_{Channel}$ | $dBm/BW_{Channel}$ |
| | | | | $SCS_{SSB}$ = 15 kHz | $SCS_{SSB}$ = 30 kHz | | |
| ±4.5 | ±9 | ≥-6 | NR_FDD_FR1_A, NR_TDD_FR1_A, NR_SDL_FR1_A | -121 | -118 | N/A | -70 |
| | | | NR_FDD_FR1_B | -120.5 | -117.5 | N/A | -70 |
| | | | NR_TDD_FR1_C | -120 | -117 | N/A | -70 |
| | | | NR_FDD_FR1_D, NR_TDD_FR1_D | -119.5 | -116.5 | N/A | -70 |
| | | | NR_FDD_FR1_E, NR_TDD_FR1_E | -119 | -116 | N/A | -70 |
| | | | NR_FDD_FR1_F | -118.5 | -115.5 | N/A | -70 |
| | | | NR_FDD_FR1_G | -118 | -115 | N/A | -70 |
| | | | NR_FDD_FR1_H | -117.5 | -114.5 | N/A | -70 |
| ±8 | ±11 | ≥-6 | NR_FDD_FR1_A, NR_TDD_FR1_A, NR_SDL_FR1_A, NR_FDD_FR1_B, NR_TDD_FR1_C, NR_FDD_FR1_D, NR_TDD_FR1_D, NR_FDD_FR1_E, NR_TDD_FR1_E, NR_FDD_FR1_F, NR_FDD_FR1_G, NR_FDD_FR1_H | N/A | N/A | -70 | -50 |
| NOTE 1: Io is assumed to have constant EPRE across the bandwidth. | | | | | | | |
| NOTE 2: NR operating band groups in FR1 are as defined in clause 3.5.2. | | | | | | | |

FIG. 1

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In NR, a user terminal (User Equipment (UE)) corresponds to an RRC connected state (RRC_CONNECTED state) or an RRC inactive (RRC_INACTIVE) state when a radio resource control (RRC) connection is established. The UE for which the RRC connection is not established corresponds to an RRC idle (RRC_IDLE) state. These states are also referred to as UE states, RRC states, or the like.

The UE in the RRC connected state, the UE in the RRC inactive state, and the UE in the RRC idle state may be referred to as a connected UE, an inactive UE, and an idle UE, respectively.

In Rel-16 NR, relaxed measurement is introduced. Specifically, an idle UE/inactive UE satisfying a specific condition may apply relaxation of mobility measurement in relation to cell reselection.

Incidentally, according to existing NR specifications, a connected UE uses, for radio resource management (RRM) measurement, a periodically transmitted downlink (DL) reference signal (for example, a synchronization signal block (SSB)/channel state information reference signal (CSI-RS)). On the basis of a result of measurement/reporting by the UE, handover and cell selection/reselection are performed.

However, periodic RRM measurement/reporting leads to an increase in load on the UE, and periodic reference signal transmission from a base station leads to overhead in a network. In future radio communication systems (for example, Rel-17 NR, Rel-18 (or later versions) NR, and the like), reduction of the measurement/reporting/reference signal transmission is required, but a study of the reduction has not yet advanced. If reduction of the measurement/reporting/reference signal transmission fails, load on the UE may increase, or an increase in communication throughput may be suppressed.

Thus, an object of the present disclosure is to provide a terminal, a radio communication method, and a base station that can appropriately perform relaxation of measurement/reporting.

Solution to Problem

A terminal according to one aspect of the present disclosure includes a control section that determines, in a radio resource control (RRC) connected state, relaxation of at least one of measurement and reporting for radio resource management (RRM) on the basis of a given condition, and a transmitting/receiving section that performs at least one of the measurement and reporting to which the relaxation is applied.

Advantageous Effects of Invention

According to one aspect of the present disclosure, it is possible to appropriately perform relaxation of measurement/reporting.

BRIEF DESCRIPTION OF DRAWINGS

FIG. 1 shows SS-RSRP intra-frequency absolute accuracy in FR1 with Table 10.1.2.1.1-1 of 3GPP TS38.133 V16.7.0 (2021 March).

DESCRIPTION OF EMBODIMENTS (UE State)

Figure 2:
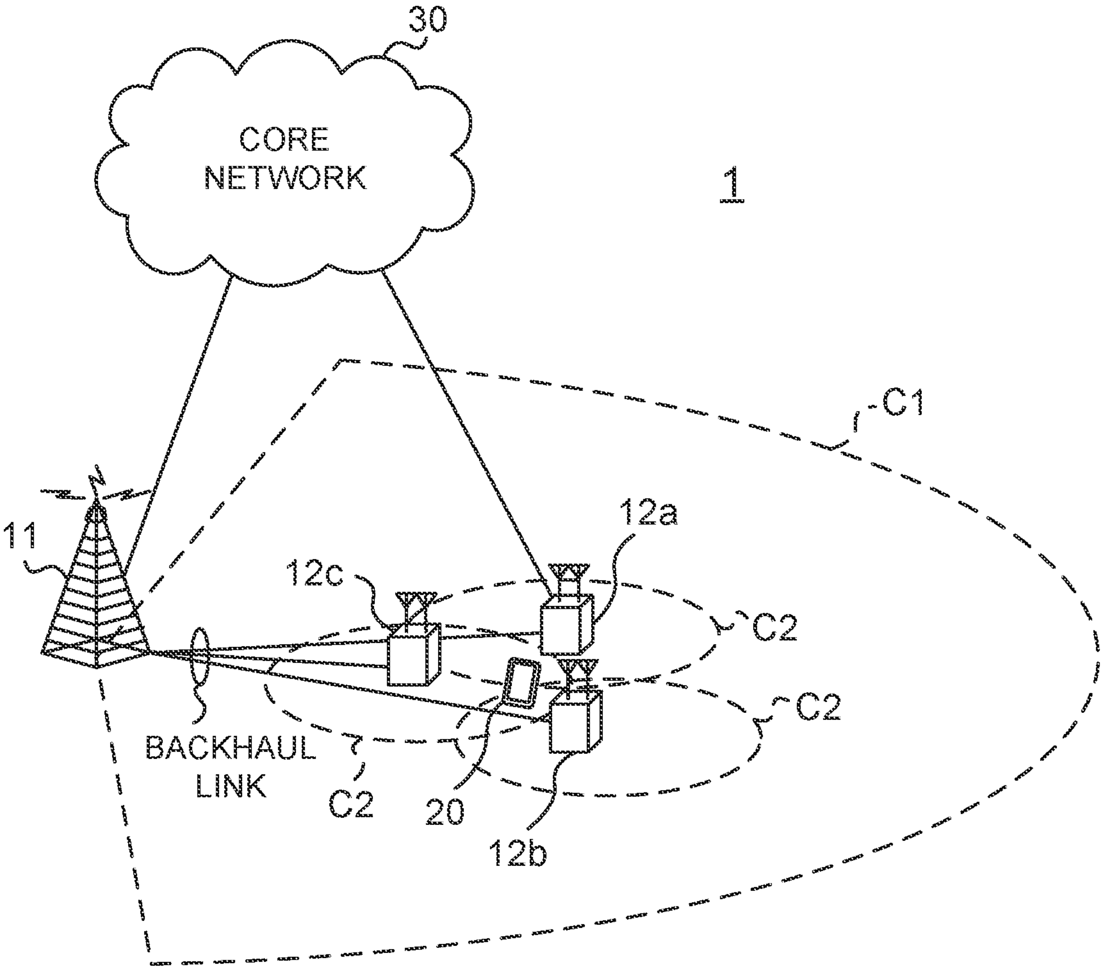
FIG. 2 is a diagram to show an example of a schematic structure of a radio communication system according to one embodiment.

In NR, a user terminal (User Equipment (UE)) corresponds to an RRC connected state (RRC_CONNECTED state) or an RRC inactive (RRC_INACTIVE) state when a radio resource control (RRC) connection is established. The UE for which the RRC connection is not established corresponds to an RRC idle (RRC_IDLE) state. These states are also referred to as UE states, RRC states, or the like.

The UE in the RRC connected state, the UE in the RRC inactive state, and the UE in the RRC idle state may be referred to as a connected UE, an inactive UE, and an idle UE, respectively.

UE operation varies depending on a UE state. For example, the idle UE may monitor a paging channel, may perform neighboring cell measurement and cell selection/reselection, and may perform acquisition of system information.

The inactive UE holds a context for RRC/Non Access Stratum (NAS)/Access Stratum (AS). Operation by the inactive UE is roughly the same as that by the inactive UE, and thus can be operated with low power consumption. The context is held in each node (UE/base station/core network), and thus the inactive UE can achieve a return to the RRC connected state by using a relatively small number of signals.

In place of or in addition to operation by the idle UE/inactive UE, the connected UE may monitor a control channel related to a shared data channel (for example, a downlink shared channel (Physical Downlink Shared Channel (PDSCH)) or an uplink shared channel (Physical Uplink Shared Channel (PUSCH))) for judging data scheduled for the connected UE itself, may provide channel quality/feedback information, and may perform neighboring cell measurement and measurement reporting.

(Mobility Measurement)

In NR, the idle UE/inactive UE performs mobility measurement in relation to cell reselection.

Note that in the present disclosure, the mobility measurement may mean at least one of intra-frequency (or same frequency) measurement, inter-frequency (or different frequency) measurement, inter-PAT measurement, measurement of an intra-frequency cell, measurement of an inter-frequency cell, measurement of an inter-RAT frequency cell, and the like.

In the mobility measurement, the UE identifies a new cell (intra-frequency cell/inter-frequency cell/inter-RAT frequency cell), and performs, for the identified cell, measurement of synchronization signal received power (Synchronization Signal Reference Signal Received Power (SS-RSRP)) and synchronization signal received quality (Synchronization Signal Reference Signal Received Quality (SS-RSRQ)).

The UE may evaluate, in a given period ($T_{detect,X}$), whether a new detectable cell satisfies reselection criteria. The UE may perform SS-RSRP/SS-RSRQ measurement for the identified cell at intervals of a given period ($T_{measure,X}$). The UE may perform, in a given period ($T_{evaluate,X}$) for a cell that has been detected but has not been reselected thus far, filtering of SS-RSRP/SS-RSRQ measurement capable of evaluating the cell satisfying the reselection criteria.

Note that these Xs may be, for example, Intra, Inter, EUTRAN, and so on, and may correspond to respective ones of intra-frequency measurement, inter-frequency measurement, and inter-RAT measurement, and $T_{detect,X}$/$T_{measure,X}$/$T_{evaluate,X}$ may vary for each X.

(Relaxed Measurement)

In Rel-16 NR, relaxed measurement is introduced. Specifically, an idle UE/inactive UE satisfying a specific condition may apply relaxation of mobility measurement in relation to cell reselection. In the present disclosure, "relaxation of measurement" may mean that required measurement is limited.

In Rel-16 NR, an RRC parameter for the relaxed measurement (relaxedMeasurement) may be notified to the UE by using system information block (SIB) 2. relaxedMeasurement may further include a parameter indicating criteria for detecting that the UE is absent at a cell edge (cellEdgeEvaluation) or a parameter indicating criteria for detecting that the UE has low mobility (lowMobilityEvaluation).

The idle UE/inactive UE may, in a case where lowMobilityEvaluation is configured and where ($Srxlev_{Ref}$–Srxlev) <$S_{SearchDeltaP}$, is satisfied, select application of the relaxed measurement to the mobility measurement. A case that this equation is satisfied may mean that the UE has low mobility.

Here, Srxlev is a current cell selection reception level value (Cell selection RX level value) [unit (decibel (dB))], $Srxlevr_{Ref}$ is a reference Srxlev value of a serving cell (after selection/reselection of a new cell), and $S_{SearchDeltaP}$ is a threshold value for variation in an Srxlev value for the relaxed measurement. $S_{SearchDeltaP}$ may be notified by lowMobilityEvaluation.

The idle UE/inactive UE may, in a case where cellEdgeEvaluation is configured and where Srxlev>$S_{SearchThresholdP}$ (and Squal>$S_{SearchThresholdQ}$ (if $S_{SearchThresholdQ}$ is configured)) is satisfied, select application of the relaxed measurement to the mobility measurement. A case that this equation (or these equations) is satisfied may mean that the UE is absent at a cell edge.

Here, Squal is a current cell selection quality value [unit (decibel (dB))], $S_{SearchThresholdP}$ is a threshold value for Srxlev for the relaxed measurement, and $S_{SearchThresholdQ}$ is a threshold value for Squal for the relaxed measurement. $S_{SearchThresholdP}$, $S_{SearchThresholdQ}$ and the like may be notified by cellEdgeEvaluation.

When the relaxed measurement is applied to the mobility measurement, as $T_{detect,\ X}$/$T_{measure,\ X}$/$T_{evaluate,\ X}$ mentioned above, a greater value (for example, a tripled value) is applied, as compared to $T_{detect,\ X}$/$T_{measure,\ X}$/$T_{evaluate,\ X}$ in normal cases (when the relaxed measurement is not applied). Therefore, a measurement periodicity for the mobility measurement becomes longer, and thus the number of times (frequency) of measurement is reduced.

Incidentally, according to existing NR specifications, a connected UE uses, for radio resource management (RRM) measurement, a periodically transmitted downlink (DL) reference signal (for example, a synchronization signal block (SSB)/channel state information reference signal (CSI-RS)). On the basis of a result of measurement/reporting by the UE, handover and cell selection/reselection are performed. Note that RRM measurement may mean measurement configured by a MeasConfig information element, a MeasObjectNR information element, or the like of RRC (for example, SSB-based RRM measurement/CSI-RS-based RRM measurement).

However, periodic RRM measurement/reporting leads to an increase in load on the UE, and periodic reference signal transmission from a base station leads to overhead in a network. In future radio communication systems (for example, Rel-17 NR, Rel-18 (or later versions) NR, and the like), reduction of the measurement/reporting/reference signal transmission is required, but a study of the reduction has not yet advanced. If reduction of the measurement/reporting/reference signal transmission fails, load on the UE may increase, or an increase in communication throughput may be suppressed.

Thus, the inventors of the present invention came up with the idea of a method for relaxing measurement/reporting by the UE. According to this, it is possible to appropriately achieve reduction of UE load/UE power consumption, reduction of overhead, and the like by omitting/relaxing RRM measurement even when, for example, in future radio communication systems (for example, Rel-17 NR, Rel-18 (or later versions) NR, and the like), a new network topology is employed or diversification of UE types or the like occurs.

Embodiments according to the present disclosure will be described in detail with reference to the drawings as follows. The radio communication methods according to respective embodiments may each be employed individually, or may be employed in combination.

Note that in the present disclosure, "A/B" may mean "at least one of A and B."

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI) or uplink control information (UCI).

In the present disclosure, activate, deactivate, indicate, select, configure, update, determine, and the like may be interchangeably interpreted.

In the present disclosure, a panel, a beam, a panel group, a beam group, an Uplink (UL) transmission entity, a TRP, spatial relation information (SRI), a spatial relation, a control resource set (CORESET), a Physical Downlink Shared Channel (PDSCH), a codeword, a base station, a given antenna port (for example, a demodulation reference signal (DMRS) port), a given antenna port group (for example, a DMRS port group), a given group (for example, a code division multiplexing (CDM) group, a given reference signal group, or a CORESET group), a given resource (for example, a given reference signal resource), a given resource set (for example, a given reference signal resource set), a CORESET pool, a PUCCH group (PUCCH resource group), a spatial relation group, a downlink Transmission Configuration Indication state (TCI state) (DL TCI state), an uplink TCI state (UL TCI state), a unified TCI state, QCL, and the like may be interchangeably interpreted.

In the present disclosure, an index, an ID, an indicator, and a resource ID may be interchangeably interpreted. In the present disclosure, a sequence, a list, a set, a group, a cluster, a subset, and the like may be interchangeably interpreted.

Embodiments below will be described by basically assuming RRM measurement for measurement, but are not limited to this. In other words, in the present disclosure, the measurement, RRM measurement, intra-frequency (or same frequency) measurement, inter-frequency (or different frequency) measurement, inter-RAT measurement, third party operator (or inter-operator) frequency measurement (inter-operator measurement), mobility measurement, radio link monitoring (RLM) measurement, beam management measurement, beam measurement, measurement for beam failure detection, measurement for candidate beam detection, channel state information (CSI) measurement, Layer 1 (L1) measurement, Layer 2 (L2) measurement, Layer 3 (L3) measurement, and the like may be interchangeably interpreted.

Measurement in the embodiments below will be described by basically assuming measurement based on a reference signal (for example, an SSB, a CSI-RS, a DMRS, or an SRS) (measurement in a reference signal resource). In other words, in the present disclosure, the measurement may mean measurement performed by a UE/base station/Integrated Access Backhaul (LAB) node/satellite/high altitude platform station (HAPS)/high altitude pseudo satellite (HAPS)/relay station using at least one of a reference signal and another signal/channel (for example, a PDCCH, a PDSCH, a PRACH, a PUCCH, or a PUSCH).

Note that the reference signal of the present disclosure may include an interference measurement reference signal, an interference measurement resource, and the like (may be interpreted as these).

Measurement in embodiments below may indicate measurement (acquisition) of at least one of received power (for example, RSRP) in a cell (serving cell and/or neighboring cell), reception quality (for example, RSRQ, SINR, or the like) and reception strength (for example, RSSI), CSI, and the like.

Note that measurement in the present disclosure may be interpreted as measurement/reporting. Reporting in the present disclosure may mean reporting based on (or in response to) measurement.

(Radio Communication Method)

First Embodiment

A first embodiment relates to a condition for relaxation of measurement/reporting in an RRC connected state.

A UE may perform the relaxation of the measurement/reporting when satisfying any one or combinations of condition 1-1 to condition 1-5 below:

Condition 1-1: the UE transmits (reports) a specific signal/information;

Condition 1-2: the UE judges that a relaxation criterion is satisfied;

Condition 1-3: measurement is performed by using an uplink (UL) signal (for example, a UL reference signal);

Condition 1-4: the UE is under control by a specific base station/cell; and

Condition 1-5: the UE receives a specific signal/information.

Condition 1-1

The above-described specific signal/information in condition 1-1 may be, for example, at least one of the following:

The signal/information may be first information (for example, capability information) indicating that the UE does not support (or does not perform) mobility measurement, or may be incapability information Second information (for example, capability information) indicating that the UE supports (or performs), under given condition, measurement/reporting to be relaxed Third information indicating mobility type of the UE Fourth information indicating that the UE stops or starts measurement Note that in the present disclosure, a stop, suspension, omission, reduction, and the like may be interchangeably interpreted. In the present disclosure, a start, a restart, a return, an increase, and the like may be interchangeably interpreted.

Concerning the first information, "the UE does not support mobility measurement" described above may mean that the UE does not support mobility measurement at all, or may mean that the UE supports mobility measurement (for example, measurement to be relaxed) under a given condition, but does not support anything other than the mobility measurement. The UE that does not support the mobility measurement may, for example, assume that at least one of cell reselection and handover is not performed. With a non-moving UE (for example, a fixed location UE), there is no need to perform cell reselection, handover, and the like, and thus processing load on the UE can be appropriately suppressed.

Concerning the first information and the second information, the above-described "given condition" may correspond to at least one of condition 1-1 to condition 1-5 described above.

Concerning the third information, the mobility type may correspond to at least one of a fixed location UE, a movable/moving UE, a UE without mobility (no mobility UE), a low mobility UE, a middle mobility UE, a high mobility UE, a cell-edge UE, a non-cell-edge UE (not-cell-edge UE), and the like.

Note that in the present disclosure, a mobility type to which the relaxation of the measurement/reporting is applied may correspond to at least one of these, and may be, for example, a fixed location UE, a low mobility UE, or the like.

Together with or in place of the above-described information indicating the mobility type, information indicating at least one of location information about the UE (for example, latitude and longitude), a movement speed of the UE, acceleration of the UE, a movement direction of the UE, and the like may be used as the above-described third information. Note that a movement speed/acceleration for application of the relaxation of the measurement/reporting may correspond to a value less than or equal to a specific threshold value. The specific threshold value may be predetermined by specifications, may be notified from a base station to the UE by using higher layer signaling (for example, an RRC parameter or a MAC CE), physical layer signaling (for example, DCI), or a combination of these, or may be judged on the basis of a UE capability.

The UE may judge a mobility type to which the UE itself currently corresponds, on the basis of at least one of a result of the measurement and a result of acquisition of the location information/movement speed/acceleration.

Note that in the present disclosure, the location information/movement speed/acceleration may be acquired by the UE/base station on the basis of a satellite positioning system (for example, Global Navigation Satellite System (GNSS), Global Positioning System (GPS), or the like), or may be acquired/modified on the basis of UE-to-UE communication/UE-to-base station communication (may be judged on the basis of, for example, a Doppler shift of a reference signal transmitted from the base station (or a QCL-related parameter), or the like).

The fourth information may include information about a period in which the measurement is stopped. In this case, for example, the UE may, when transmitting the fourth information including the information about a period in which the measurement is stopped, stop the measurement during the period after the transmission, and may restart the measurement if the period expires. Also, the UE may, when transmitting the fourth information indicating stopping of the measurement but not including the information about a period in which the measurement is stopped, stop the measurement until subsequently transmitting the fourth information indicating starting of the measurement.

The information about a period in which the measurement is stopped may include at least one of information related to a length of the period, information related to a periodicity of the period, information related to offset of the period, and the like.

Note that the period in which the measurement is stopped may be predetermined by specifications, may be notified from the base station to the UE by using higher layer signaling (for example, an RRC parameter or a MAC CE), physical layer signaling (for example, DCI), or a combination of these, or may be judged on the basis of a UE capability. In this case, the UE may, when transmitting the fourth information, stop the measurement during the period after the transmission, and may restart the measurement if the period expires.

Note that the fourth information may include or may not include information (for example, a bit) explicitly indicating stopping/starting of the measurement. In a case of the latter, the UE may judge stopping/starting of the measurement on the basis of whether the measurement is currently stopped and whether to transmit the fourth information. The above-mentioned information about a period in which the measurement is stopped may correspond to information explicitly indicating stopping of the measurement.

In the above description related to the fourth information, stopping and starting may be interchangeably interpreted (or vice versa).

Note that the fourth information indicates a start (/end) of the relaxation of the measurement, and thus may be referred to as measurement relaxation report information, measurement relaxation activation/deactivation information, measurement relaxation trigger information, or the like. The fourth information may, when the relaxation of the measurement/reporting is performed on the basis of an arbitrary condition, be used for simply notifying the relaxation of the measurement/reporting to the base station.

The UE may transmit at least one of the above-described first to fourth information to a network (for example, the base station) by using higher layer signaling (for example, an RRC parameter or a MAC CE), physical layer signaling (for example, UCI), or a combination of these. For example, CSI indicating the third or fourth information may be newly defined, and the third or fourth information may be transmitted by the CSI.

Note that the above-described first to fourth information may be explicitly or implicitly transmitted by using a specific channel/reference signal (for example, a PRACH, a PUCCH, a PUSCH, an SRS, a DMRS, or a PTRS). For example, at least one of the above-described first to fourth information may be implicitly reported by a signal sequence of the channel/reference signal to be transmitted, the signal sequence being a specific sequence associated with at least one of the above-described first to fourth information.

Condition 1-2

The above-described relaxation criterion may be predetermined by specifications, may be notified from the base station to the UE by using higher layer signaling (for example, an RRC parameter or a MAC CE), physical layer signaling (for example, DCI), or a combination of these, or may be judged on the basis of a UE capability.

The above-described relaxation criterion may be a criterion based on a measurement result. For example, the above-described relaxation criterion may be a criterion for judging that the UE is not moving (is in a no mobility state), or may be a criterion for judging that the UE is a UE corresponding to at least one of such mobility types as those mentioned above.

The measurement result may include at least one of a result of the measurement and a result of acquisition of the location information/movement speed/acceleration.

Note that the criterion based on the measurement result in condition 1-2 may be a criterion related to RRM measurement (or mobility measurement), a criterion related to Layer 1 measurement (for example, a criterion related to L1-RSRP/RSRQ), a criterion related to beam measurement (for example, a criterion for judgment of beam failure detection: a Block Error Rate (BLER) related to radio link quality of a beam failure detection reference signal, or the like), a criterion related to measurement for positioning (for example, a criterion related to measurement of a Positioning Reference Signal (PRS), or the like), or may be a criterion with consideration of a plurality of criteria out of these criteria. Note that the relaxation criterion may vary for each mobility type to which the UE corresponds, or may be the same for a plurality of mobility types.

Condition 1-3

In condition 1-3 described above, the UE transmits a UL signal, and the base station performs measurement by using the UL signal. This UL signal transmission for the measurement may be configured for the UE by configuration for RRM measurement (MeasConfig information element of RRC). Note that in Rel-15/16 NR, the configuration for RRM measurement can configure only measurement of an SSB/CSI-RS.

For example, the UL signal may be an SRS, or may be another reference signal (for example, a DMRS).

Note that the above-described UL signal may be configured for the UE by configuration for an SRS (SRS-Config information element of RRC). For example, if a value indicating RRM measurement as usage (for example, "rrm-Measurement") is configured in an SRS resource set configuration (SRS-ResourceSet) or an SRS resource configuration (SRS-Resource) included in the configuration for an SRS, an SRS corresponding to the SRS resource set configuration or SRS resource configuration may correspond to the UL signal of condition 1-3.

Note that the base station may transmit a trigger signal/information for triggering the UL signal of condition 1-3 for the UE. The UE may transmit the above-described UL signal aperiodically/semi-persistently on the basis of the trigger signal/information. The trigger signal/information may be notified by higher layer signaling (for example, an RRC parameter or a MAC CE), physical layer signaling (for example, DCI), or a combination of these, and may be an SRS request field included in DCI.

Note that for the relaxation related to condition 1-3, the measurement by the UE in the present disclosure may be interpreted as the above-described UL signal transmission by the UE (or the above-described UL signal measurement by the base station). For the relaxation related to condition 1-3, the reporting by the UE in the present disclosure may be interpreted as reception, in the UE, of a report from the base station (or a report from the base station).

Condition 1-4

The above-described specific base station/cell in condition 1-4 may be a base station/cell using a specific frequency band (for example, FR4 to cover 52.6 GHz to 71 GHz or FR5 to cover 95 GHz to 325 GHz), may be a base station/cell using a specific frequency (frequency greater than or equal to a given value), may be a base station/cell with a coverage area less/greater than or equal to a given size, or may be a base station/cell to perform communication in accordance with specific release (for example, Rel. 18) of 3GPP.

Condition 1-5

The above-described specific signal/information in condition 1-5 may be information indicating that the mobility measurement is not performed (or prohibited).

The above-described specific signal/information in condition 1-5 may be the fourth information mentioned in condition 1-1. The above-mentioned fourth information may be notified from the base station to the UE by using higher layer signaling (for example, an RRC parameter or a MAC CE), physical layer signaling (for example, DCI), or a combination of these. For example, the UE may, when receiving the fourth information including information about a period in which the measurement is stopped, stop the measurement during the period, and may restart the measurement if the period expires.

The above-described specific signal/information in condition 1-5 may be notified from the base station to the UE by using higher layer signaling (for example, an RRC parameter or a MAC CE), physical layer signaling (for example, DCI), or a combination of these. The above-described specific signal/information may be explicitly or implicitly notified to the UE by using a specific channel/reference signal (for example, an SSB, a PDCCH, a PDSCH, a CSI-RS, or a DMRS).

According to the first embodiment described above, it is possible to appropriately control relaxation of measurement/reporting in an RRC connected state.

Second Embodiment

A second embodiment relates to details of relaxation of measurement/reporting in an RRC connected state.

A case that the measurement/reporting is relaxed may mean that by using a given measurement/report configuration as a reference, part or all of measurement/reporting based on the configuration are omitted (are not performed), or may mean that measurement/reporting for which frequency in the configuration is reduced (for example, the number of times of measurement is reduced or a measurement periodicity is extended) is performed.

For example, when SSB-based RRM measurement is relaxed, a UE may omit measurement of some SSBs for an SSB to be measured, the SSB being configured by an SSB-ToMeasure information element of RRC. For example, the UE may measure the SSB at a number of locations less than that of configured locations (symbol locations, patterns, or the like corresponding to SSB indices).

When CSI-RS-based RRM measurement is relaxed, the UE may omit measurement of some CSI-RSs for a CSI-RS to be measured, the CSI-RS being configured by a CSI-RS-ResourceConfigMobility information element of RRC. For example, the UE may measure the CSI-RS at a periodicity longer than a configured periodicity, may measure the CSI-RS in a resource block with a bandwidth narrower than a configured resource block, may measure the CSI-RS in a number of symbols less than that of configured symbols, or may measure the CSI-RS by assuming density lower than configured density.

Note that as it has been already mentioned that "A/B" may mean "at least one of A and B," "the measurement/reporting is relaxed" may mean "the measurement is relaxed," "the reporting is relaxed," or "both of the measurement and the reporting are relaxed." A degree of relaxation of the measurement and a degree of relaxation of the reporting may be the same (for example, frequency of the measurement and the reporting is reduced at the same rate), or may be different from each other.

In the relaxation of the measurement, frequency of the measurement may be changed by relaxing a threshold value or a range related to accuracy of a measured value (for example, RSRP/RSRQ) to be satisfied in the measurement. For example, existing specifications (3GPP TS38.133) define, for measurement reporting, the necessity of a specific accuracy requirement satisfied by measurement of RSRP/RSRQ/RS-SINR to be reported.

FIG. 1 shows SS-RSRP intra-frequency absolute accuracy in FR1 with Table 10.1.2.1.1-1 of 3GPP TS38.133 V16.7.0 (2021 March).

In FIG. 1, a value shown in a column "Accuracy" is the accuracy to be satisfied. The accuracy is described as ±4.5 [dB] or ±8 [dB] in a normal condition for each band (or band group). For example, when the UE measures SS-RSRP in a given period or given times, the accuracy requirement is satisfied if a difference between a plurality of SS-RSRP measurement results is in this accuracy range (for example, −4.5 or more and +4.5 or less), and the UE may report SS-RSRP based on these measurement results.

When the relaxation of the measurement is applied, the UE may judge that the accuracy to be satisfied is accuracy with such various values/ranges as those shown in FIG. 1 increased/reduced/extended/shrunk (more reduced accuracy) as compared to a case where the relaxation is not applied. For example, when the relaxation of the measurement is applied, the UE may assume, for the SS-RSRP intra-frequency absolute accuracy in FR1, that the value shown in the column "Accuracy" with the normal condition of FIG. 1 is ±10, instead of ±4.5 (the range is extended).

Note that in the relaxation of the measurement, in addition to a value of the column "Accuracy" or in place of the value, at least one of values/ranges of a condition column "Conditions" may be changed (for example, increased/reduced/extended/shrunk). For example, in the relaxation of the measurement, a range of a value capable of being taken by Io (total received power density including signals and interference) defined for each of at least one of a band (or band group), a bandwidth, and SCS (for example, SCS of a reference signal (SSB/CSI-RS or the like)) (or minimum Io/maximum Io shown in FIG. 1) may be changed (for example, increased/reduced/extended/shrunk).

In the relaxation of the measurement, a value/range of Es/Iot (strictly speaking, a hat symbol (^) is present above "E", as shown in FIG. 1) defined for the band (or band group) may be changed (for example, increased/reduced/extended/shrunk). Note that Es/Iot is the ratio of Es being received energy for each resource element between valid parts of a symbol (note, however, that power is normalized for subcarrier spacing) to Iot being total noise-plus-interference received power spectrum density for a given resource element (note, however, that power is integrated (or unified) across the resource element, and is further normalized for subcarrier spacing).

Relaxation of accuracy of the measurement allows measurement/reporting to be performed with lower frequency/shorter period.

Note that as described in the first embodiment, the UE may perform, on the basis of notification from a base station, relaxation of the measurement/reporting (omission of the measurement/reporting or reduction of frequency of the measurement/reporting) in a given period.

An interval (periodicity) for the measurement/reporting may vary depending on a value of a measurement result (may vary on the basis of the value of the measurement result). For example, the UE may determine a measurement (/reporting) periodicity on the basis of at least one of the following:

If the measurement result is less than a first threshold value, the UE determines that the measurement (/reporting) periodicity is a first value.

If the measurement result is less than a second threshold value, the UE determines that the measurement (/reporting) periodicity is a second value.

If the measurement result is less than a third threshold value, the UE determines not to perform measurement (/reporting) in a period with a third value.

The first, second, and third threshold values may be different from each other, and these threshold values may be predetermined by specifications, may be notified from the base station to the UE by using higher layer signaling (for example, an RRC parameter or a MAC CE), physical layer signaling (for example, DCI), or a combination of these, or may be judged on the basis of a UE capability.

The first, second, and third values may be different from each other, and these values may be predetermined by specifications, may be notified from the base station to the UE by using higher layer signaling (for example, an RRC parameter or a MAC CE), physical layer signaling (for example, DCI), or a combination of these, or may be judged on the basis of a UE capability.

Note that when the relaxation of the measurement is applied, the base station may perform omission or reduction of frequency of transmission of a reference signal not to be used by the UE for the measurement.

According to the second embodiment described above, it is possible to appropriately control relaxation of measurement/reporting in an RRC connected state.

Third Embodiment

A third embodiment relates to relaxation of measurement in an RRC idle/RRC inactive state.

Control related to relaxation of measurement/reporting in an RRC connected state, described in the first and second embodiments, may be used as control related to the relaxation of the measurement in the RRC idle/RRC inactive state.

For example, an idle UE/inactive UE may judge the relaxation of the measurement on the basis of a mobility type, described in the first embodiment. For example, the idle UE/inactive UE may apply the relaxation of the measurement when the idle UE/inactive UE itself corresponds to a fixed location UE or a low mobility UE.

The idle UE/inactive UE may judge the relaxation of the measurement when receiving such specific signal/information as that described in condition 1-5 of the first embodiment. The idle UE/inactive UE includes a smaller number of receivable signals/channels as compared to that of a connected UE, but may receive the specific signal/information by using at least one of the following:

Short message transmitted by DCI having cyclic redundancy check (CRC) bit scrambled by using given radio network temporary identifier (RNTI) (for example, a paging RNTI (P-RNTI))

Paging message transmitted by PDSCH scheduled by the DCI

Paging channel

System information transmitted by using MIB/SIB

PBCH included in SSB

SSB

Note that the idle UE/inactive UE may judge the specific signal/information on the basis of subcarrier spacing applied to the SSB, or a DMRS for the PBCH included in the SSB (at least one of a location, pattern, sequence, and the like of the DMRS) (the specific signal/information may be implicitly notified).

The idle UE/inactive UE may judge the relaxation of the measurement on the basis of a measurement result in such a manner as that described in condition 1-2 of the first embodiment. Note that in the third embodiment, the measurement in the first/second embodiment may be interpreted as, for example, measurement of SS-RSRP/SS-RSRQ/Srxlev/Squal.

In the third embodiment, the relaxation of the measurement described in the first/second embodiment may mean relaxation of measurement of SS-RSRP/SS-RSRQ/Srxlev/Squal, or may mean relaxation of $T_{detect,\ X}/T_{measure,\ X}/T_{evaluate,\ X}$ (for example, a greater value is applied as compared to a case where the relaxation is not performed). $T_{detect,\ X}/T_{measure,\ X}/T_{evaluate,\ X}$ relaxed on the basis of embodiments of the present disclosure may be a value different from $T_{detect,X}/T_{measure,X}/T_{evaluate,X}$ for relaxed measurement in existing Rel-16 NR.

According to the third embodiment described above, it is possible to appropriately control relaxation of measurement/reporting in an RRC connected state.

Others

Note that the above-mentioned relaxation of the measurement/reporting in each embodiment may be applied to one or a plurality of measurements out of intra-frequency measurement, inter-frequency measurement, and inter-RAT measurement.

As interpretation of the measurement is described, the above-mentioned relaxation of the measurement/reporting in each embodiment may be applied to, for example, relaxation of CSI measurement/CSI report. When the CSI measurement is relaxed, the UE may omit measurement of some CSI-RSs for a CSI-RS to be measured, the CSI-RS being configured by an NZP-CSI-RS-Resource information element of RRC. For example, the UE may measure the CSI-RS at a periodicity longer than a configured periodicity, may measure the CSI-RS in a resource block with a bandwidth narrower than a configured resource block, may measure the CSI-RS in a number of symbols less than that of configured symbols, or may measure the CSI-RS by assuming density lower than configured density.

When the CSI report is relaxed, the UE may omit some CSI reports for a CSI report configured by a CSI-ReportConfig information element of RRC. For example, the UE may report CSI at a periodicity longer than a configured periodicity.

Note that the CSI measurement/report capable of being relaxed may be any one of periodic CSI measurement/report, semi-persistent CSI measurement/report, and aperiodic CSI measurement/report, or may be a plurality of (for example, all) measurements/reports out of these measurements/reports. When relaxation of the CSI measurement/CSI report is applied, the UE may relax only CSI measurement/CSI report corresponding to a specific index (for example, a CSI report configuration ID, a CSI resource configuration ID, a non-zero power CSI-RS resource ID, a non-zero power CSI-RS resource set ID, or the like).

In each measurement/report configuration in the RRC, information related to whether relaxation is enabled when relaxed measurement/report is applied may be included. In this case, the UE may apply relaxation to measurement/report for which relaxation is enabled by the information.

Note that at least one of embodiments mentioned above may be employed only in a UE that has reported a specific UE capability or that supports the specific UE capability.

The specific UE capability may indicate at least one of the following:

Whether to support relaxation of measurement

Whether to support mobility type-based control/measurement/reporting

The above-described specific UE capability may be a capability to be applied across all frequencies (in common regardless of frequencies), may be a capability for each frequency (for example, cell, band, or BWP), may be a capability for each frequency range (for example, FR1, FR2, FR3, FR4, or FR5), or may be a capability for each subcarrier spacing.

The above-described specific UE capability may be a capability to be applied across all duplex schemes (in common regardless of duplex schemes), or may be a capability for each duplex scheme (for example, a time division duplex (TDD) or a frequency division duplex (FDD)).

At least one of the above-mentioned embodiments may be employed in a case where specific information related to the above-mentioned embodiments is configured for the UE by higher layer signaling (when the specific information is not configured, operation in Rel. 15/16 is employed, for example). For example, the specific information may be information indicating enabling of relaxation of measurement (or mobility type-based control/measurement/reporting), an arbitrary RRC parameter for specific release (for example, Rel. 18), or the like. Which of embodiments/cases/conditions mentioned above control is performed on the basis of may be configured for the UE by using a higher layer parameter.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

FIG. 2 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 3:
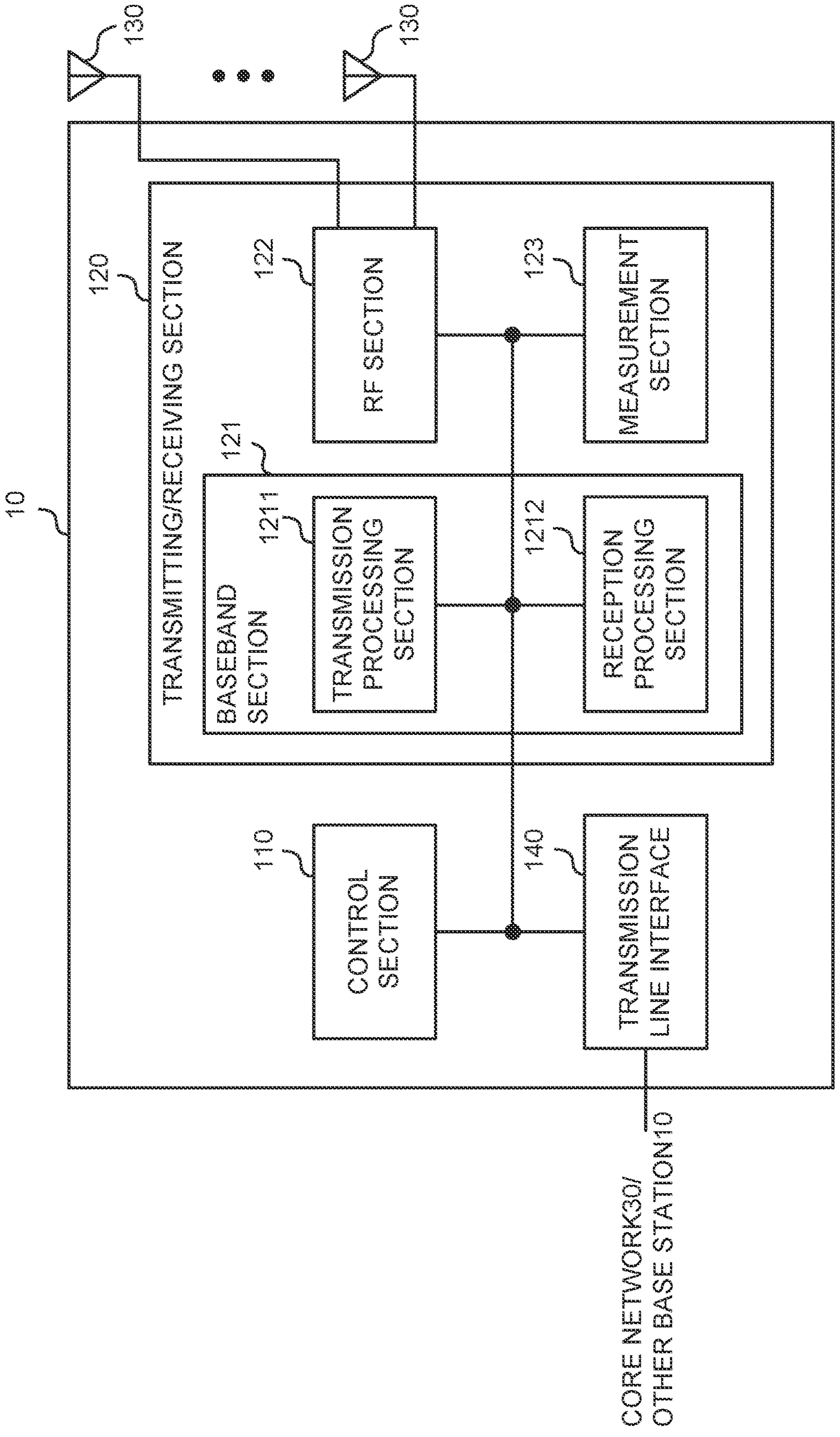
FIG. 3 is a diagram to show an example of a structure of a base station according to one embodiment.

FIG. 3 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the control section 110 may judge that relaxation of at least one of measurement and reporting for radio resource management (RPM) is applied in the user terminal 20 in a radio resource control (RRC) connected state on the basis of a given condition. This judgment may be performed by, for example, receiving measurement relaxation trigger information from the user terminal 20.

The transmitting/receiving section 120 may transmit, to the user terminal 20, a signal (for example, an SSB or a CSI-RS) used for the measurement to which the relaxation is applied.

The control section 110 may judge that relaxation of mobility measurement is applied in the user terminal 20 in a radio resource control (RRC) idle state or an RRC inactive state on the basis of a given condition. This judgment may be performed by, for example, receiving measurement relaxation trigger information from the user terminal 20.

The transmitting/receiving section 120 may transmit, to the user terminal 20, a signal (for example, an SSB or a CSI-RS) used for the measurement to which the relaxation is applied.

The control section 110 may judge that relaxation of at least one of measurement and reporting of channel state information (CSI) is applied in the user terminal 20 in a radio resource control (RRC) connected state on the basis of a given condition. This judgment may be performed by, for example, receiving measurement relaxation trigger information from the user terminal 20.

The transmitting/receiving section 120 may transmit, to the user terminal 20, a signal (for example, a CSI-RS) used for the measurement to which the relaxation is applied.

(User Terminal)

Figure 4:
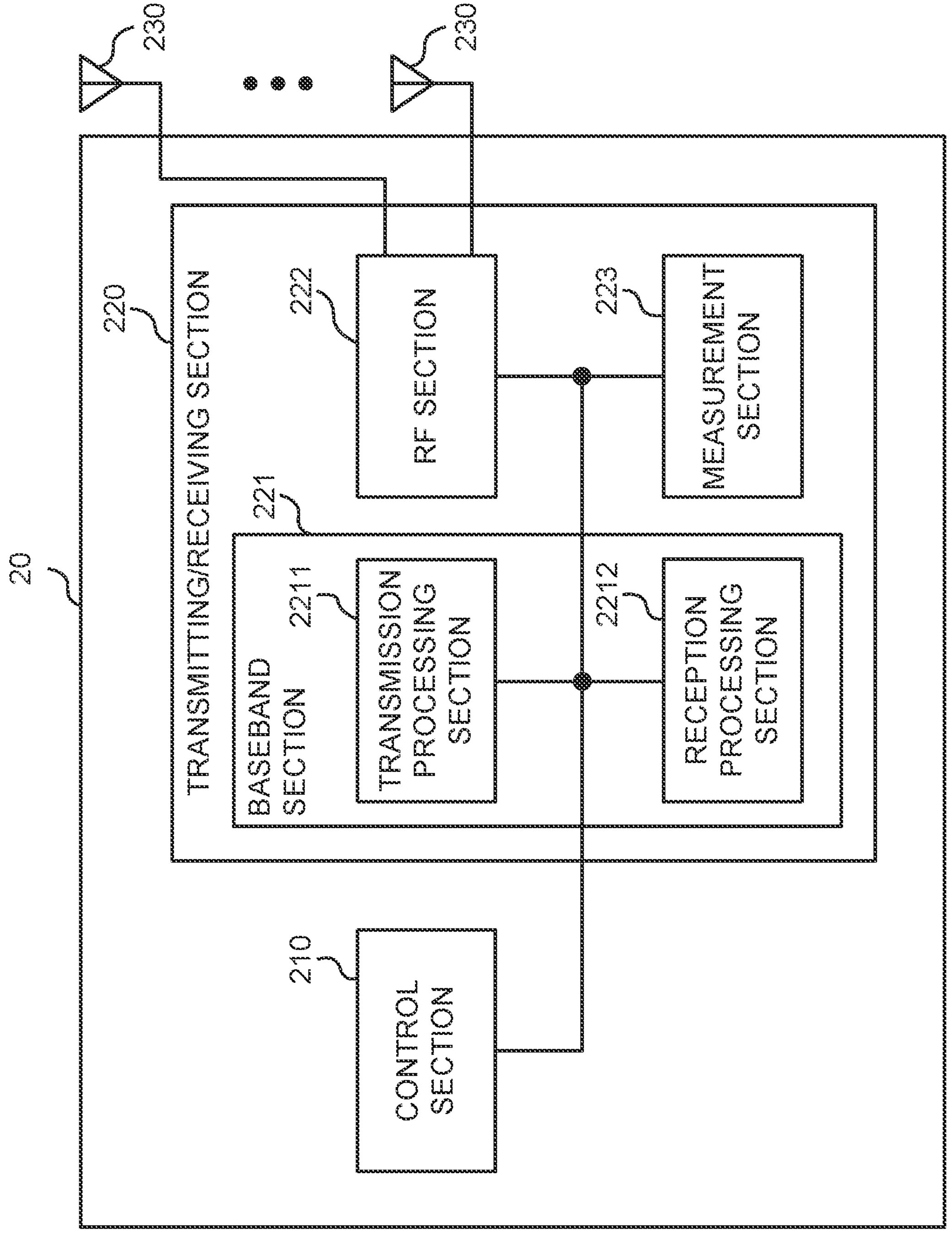
FIG. 4 is a diagram to show an example of a structure of a user terminal according to one embodiment.

FIG. 4 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on configuration of a transform precoder. The transmitting/receiving section 220 (transmission processing section 2211) may perform, for a given channel (for example, PUSCH), the DFT processing as the above-described transmission processing to transmit the channel by using a DFT-s-OFDM waveform if the transform precoder is enabled, and otherwise, may not perform the DFT processing as the above-described transmission processing.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the control section 210 may determine, in a radio resource control (RRC) connected state, relaxation of at least one of measurement and reporting for radio resource management (RPM) on the basis of a given condition. For example, this condition may be transmission of specific information, may be a measurement result satisfying a relaxation criterion, or may be the user terminal 20 being under control by a specific base station 10 or cell.

The transmitting/receiving section 220 may perform at least one of the measurement and reporting to which the relaxation is applied.

The control section 210 may determine, in a radio resource control (RRC) idle state or an RRC inactive state, relaxation of mobility measurement on the basis of a given condition. For example, this condition may be based on a mobility type of the user terminal 20, may be reception of information indicating that mobility measurement is not performed, or may be a measurement result satisfying a relaxation criterion.

The transmitting/receiving section 220 may perform the measurement to which the relaxation is applied.

The control section 210 may determine, in a radio resource control (RRC) connected state, relaxation of at least one of measurement and reporting of channel state information (CSI) on the basis of a given condition. For example, this condition may be transmission of specific information, may be a measurement result satisfying a relaxation criterion, or may be the user terminal 20 being under control by a specific base station 10 or cell.

The transmitting/receiving section 220 may perform at least one of the measurement and reporting to which the relaxation is applied.

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 5:
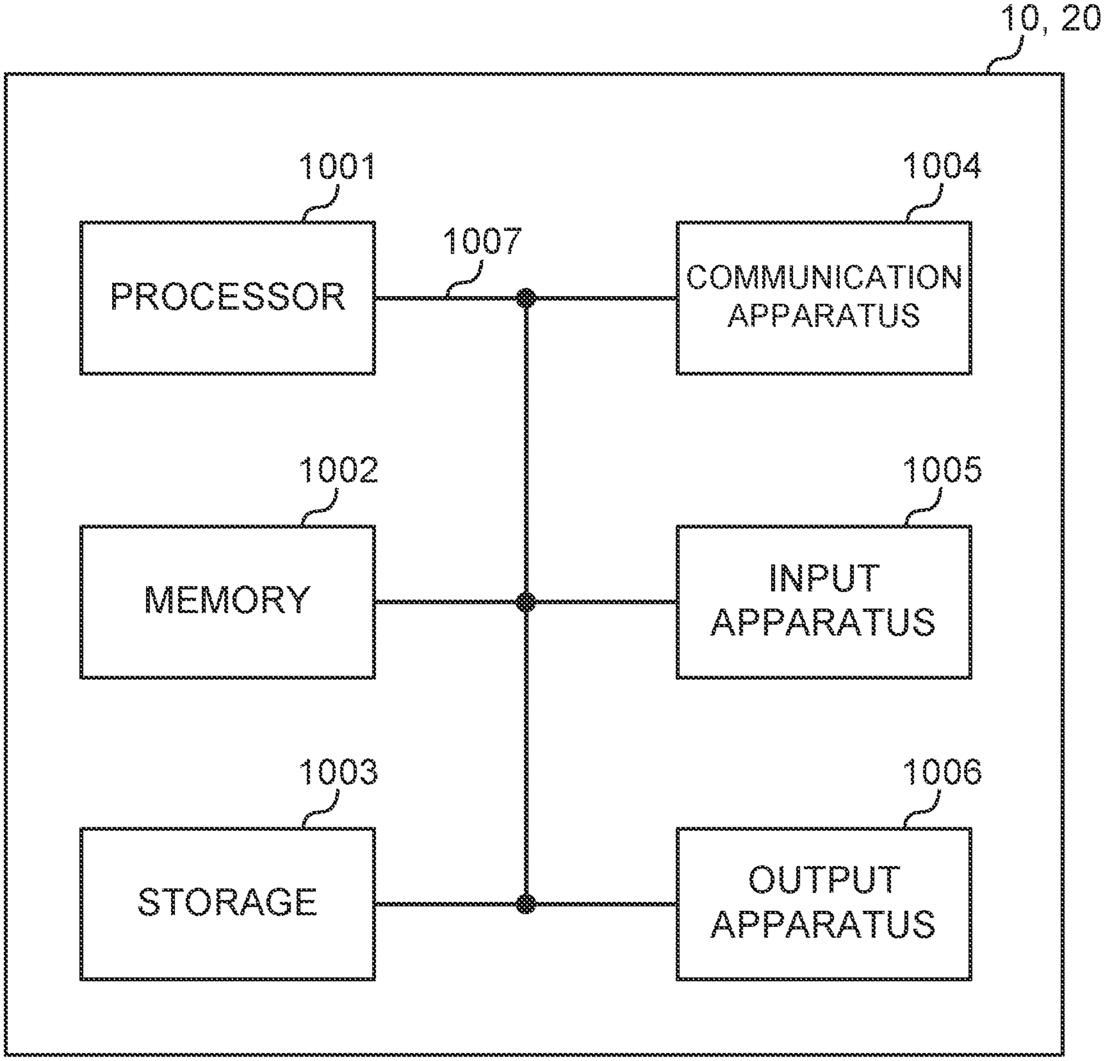
FIG. 5 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 5 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 MS.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (3 MB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a processor that determines, in a radio resource control (RRC) connected state, relaxation of at least one of measurement and reporting of channel state information (CSI) based on a given condition; and a transmitter/receiver that performs at least one of the measurement and reporting to which the relaxation is applied, wherein the given condition comprises: a transmission of incapability information that indicates at least one of the measurement and reporting is not supported, and a transmission of information about a period in which at least one of the measurement and reporting is stopped.

2. The terminal according to claim 1, wherein the given condition is the terminal being under control by a specific base station or cell, and wherein the specific base station or cell is a base station or cell with a coverage area less than or equal to a given size.

3. A radio communication method for a terminal, the radio communication method comprising:

determining, in a radio resource control (RRC) connected state, relaxation of at least one of measurement and reporting of channel state information (CSI) based on a given condition; and performing at least one of the measurement and reporting to which the relaxation is applied, wherein the given condition comprises: a transmission of incapability information that indicates at least one of the measurement and reporting is not supported, and a transmission of information about a period in which at least one of the measurement and reporting is stopped.

4. A base station comprising:

a processor that judges that relaxation of at least one of measurement and reporting of channel state information (CSI) is applied in a terminal in a radio resource control (RRC) connected state based on a given condition; and a transmitter that transmits, to the terminal, a signal used for the measurement to which the relaxation is applied, wherein the given condition comprises: a transmission of incapability information that indicates at least one of the measurement and reporting is not supported, and a transmission of information about a period in which at least one of the measurement and reporting is stopped.

* * * * *